April 8, 1941.   L. PERRONE   2,237,614
CAPPING MACHINE
Original Filed Dec. 10, 1937   2 Sheets-Sheet 1
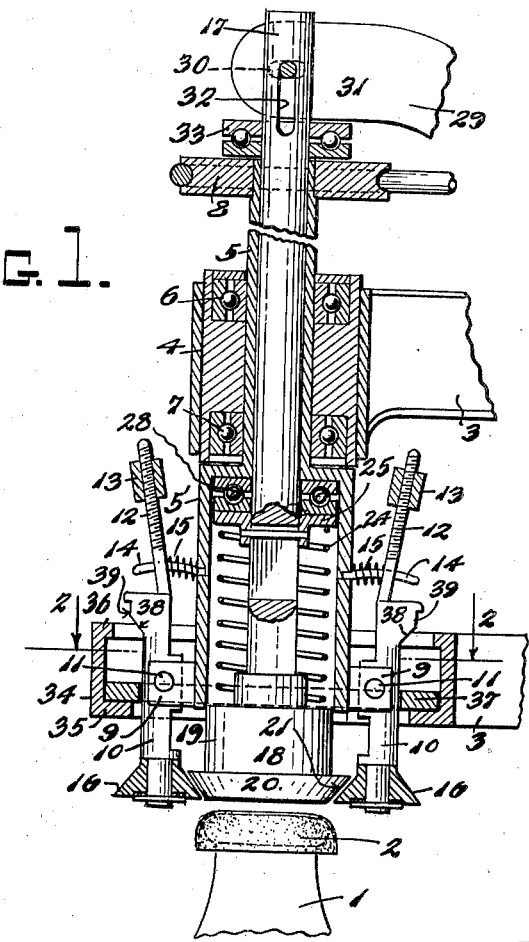
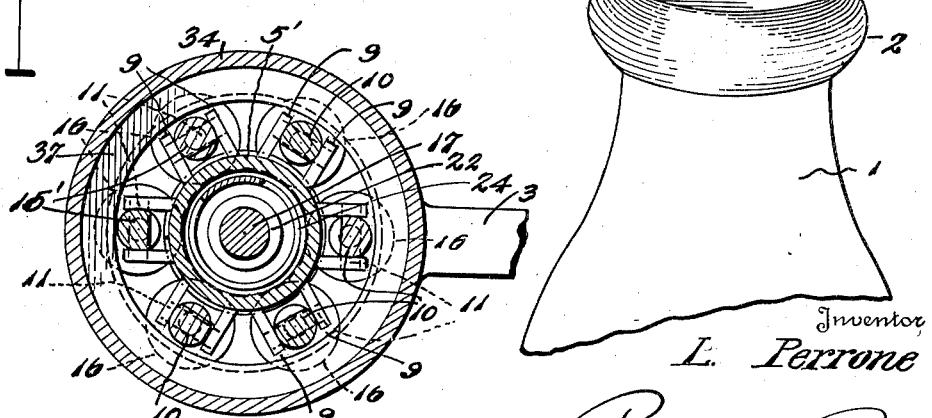
Inventor
L. Perrone
By Robb & Robb
Attorneys April 8, 1941. L. PERRONE 2,237,614
CAPPING MACHINE
Original Filed Dec. 10, 1937  2 Sheets-Sheet 2
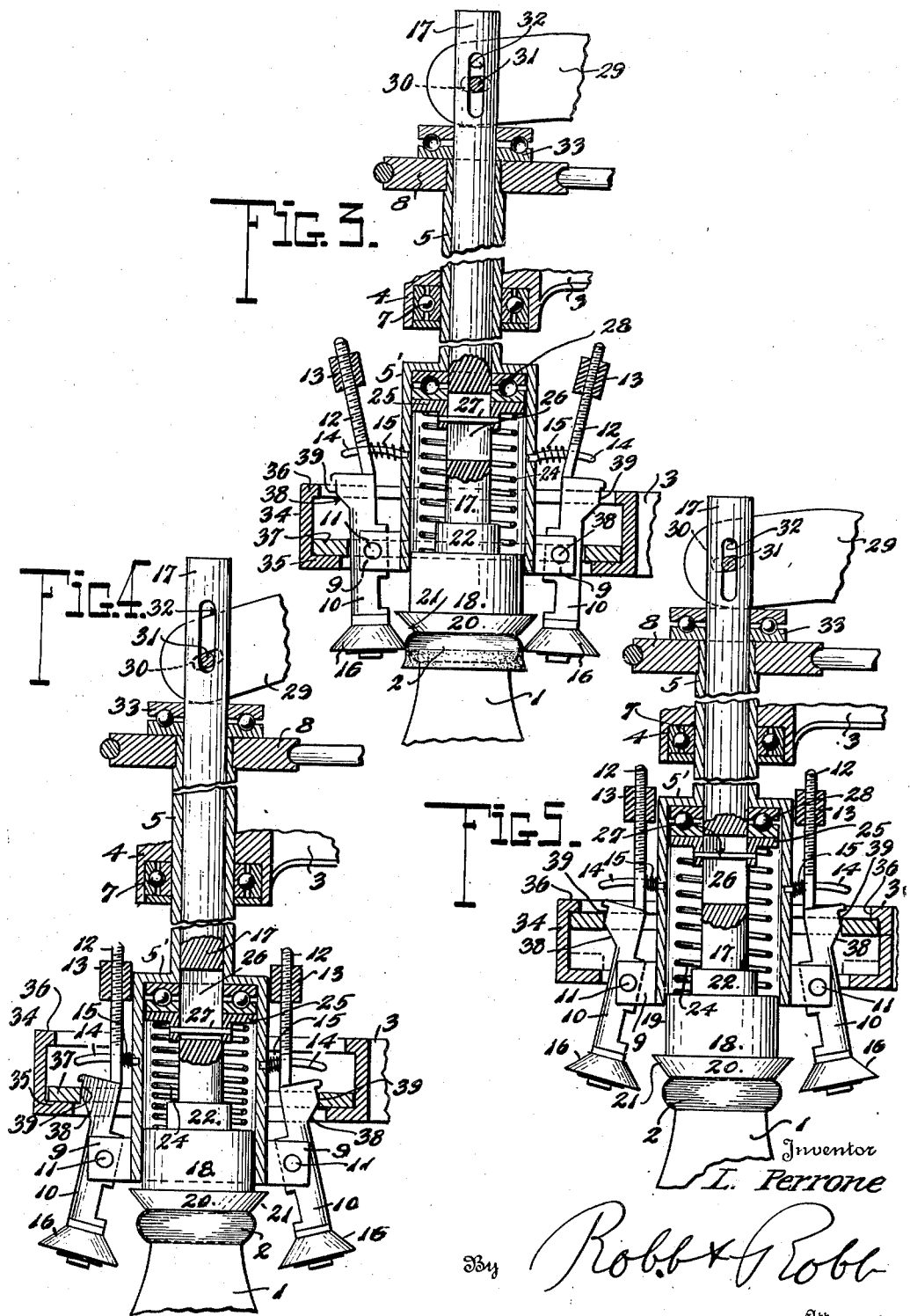
Inventor
L. Perrone
By Robb & Robb
Attorneys Patented Apr. 8, 1941

2,237,614

UNITED STATES PATENT OFFICE 2,237,614

CAPPING MACHINE

Luigi Perrone, Syracuse, N. Y., assignor to Metal Cap and Machine Corporation, Syracuse, N. Y., a corporation of New York Original application December 10, 1937, Serial No. 179,117. Divided and this application March 25, 1939, Serial No. 264,199

10 Claims. (Cl. 226—87)

This invention appertains to the application of closures to receptacles, and more especially, to an improved apparatus by which caps may be sealed on milk bottles and the like to prevent contamination of the bottle contents. This application is a division of my copending application Serial No. 179,117, filed December 10, 1937.

At the present time, more and more attention is being given to the problem of sanitation in the distribution of milk to the consuming public, and the regulations and laws governing the same are becoming more and more strict. In some states, regulations have been put into effect which require the use of so-called over-all or skirted caps on milk bottles, but even where this type of closure has already gone into use, the same are not so sealed as to effectively exclude contaminating matter.

My invention primarily concerns apparatus for use with metallic closures or caps of the aluminum foil type, the apparatus being so constructed as to effectively, expeditiously and economically seal the caps around the mouths of their receptacles. The apparatus may form a part of a composite machine as disclosed in my copending application hereinbefore referred to, or it may constitute a separate and distinct unit, whichever is preferred.

In attaining the general object of sealing the caps on their containers, it has been my aim to provide instrumentalities which will assure a more firm and tighter embracing of the receptacle by the closure than has heretofore been practiced. In fact, I find that I am able to seal the closure on the receptacle in not only a liquid-tight manner, but also an air-tight manner, thus in effect producing a hermetical seal. To this end, my apparatus includes what may be called a spinning head, which serves to spin the skirt of the closure around the outside of the lip or bead of the usual milk bottle. By reason of this spinning action just referred to, the foil of which the caps are made is caused to be pressed into intimate contact with the bottle at all points around the mouth of the same, even though there may be minute irregularities in the glass at the outer surface of the bottle.

I have found that a considerable saving of material of which the caps are made can be effected through the use of my invention, and this in itself is an important advantage, especially where the closures are made of metal foil.

A still further object of my invention is to provide an improved spinning head which includes a plurality of roller elements adapted to be pressed into contact with the closure through the action of centrifugal force which allows the roller elements to automatically follow the irregularities in the surface of the receptacle against which the closure is to be sealed, while at the same time maintaining a uniform sealing pressure.

Another object of the invention is to provide a closure sealing head, preferably of the spinning type having centrifugally actuated pressure elements, wherein the pressure elements are automatically disengaged from the closure at the completion of the sealing operation, and are maintained out of engagement with the closure until after the head has been withdrawn a predetermined distance above the closure. By virtue of this automatic disengagement just referred to, freedom from mutilation of the closure or pulling off of the closure from the receptacle is positively assured.

Other and further objects and advantages of the invention will be hereinafter described, and the novel features thereof defined in the appended claims.

In the drawings:

Figure 1 is a longitudinal vertical sectional view of my improved capping apparatus or closure sealing head, and also showing the upper portion of a receptacle with its closure loosely disposed on the mouth thereof preparatory to being sealed, the head being shown in its uppermost or inoperative position which is the starting point of the sealing cycle;

Figure 2 is a horizontal sectional view, taken about on the plane of the line 2—2 of Figure 1;

Figure 3 is a view generally similar to Figure 1, illustrating the head in an operative position and in the act of spinning the closure about the mouth of the receptacle;

Figure 4 is another view similar to Figure 1, illustrating the head at the bottom of its downward movement, in which the spinning rollers have passed beyond the lower extremity of the closure and have been moved radially outwardly through engagement of the cam surfaces on the roller supports with the floating ring;

Figure 5 is still another view generally similar to Figure 1, illustrating the head in the act of its upward movement at the time the floating ring is about to be disengaged from the roller supports preparatory to allowing the roller supports and floating ring to assume their positions illustrated in Figure 1; and Figure 6 is a fragmentary perspective view of a receptacle with the closure in its final sealed condition on the mouth thereof.

Like reference characters designate corresponding parts in the several figures of the drawings, wherein 1 denotes a receptacle such as a milk bottle or the like to which a closure member, generally designated 2, has been applied and is to be sealed on the mouth thereof. The construction of the closure 2 and the manner of making the same may be more fully understood by reference to my copending application referred to at the commencement hereof, and it will suffice for the purposes of the present application to say that the closure 2 is preferably made of metal foil shaped into cup form of slightly greater diameter than the diameter of the mouth of the receptacle 1. The closure thus is initially loosely seated on the mouth of the receptacle, with its annular skirt depending about the mouth or bead of the receptacle, as shown in Figure 1 of the drawings. Passing now to the apparatus for sealing the closure 2 on the receptacle 1, 3 designates a part of a frame which may be of any suitable construction, the same being provided with a main bearing 4 in which is journaled a sleeve 5 which is preferably rotatably supported in the main bearing 4 by spaced anti-friction bearings 6, 7, which may be of the ball-bearing type or other type, as preferred. The sleeve 5 is not only rotatable in the bearing 4, but is also axially movable in an upward and downward direction for a purpose which will hereinafter become more fully apparent. The upper end of the sleeve 5 is adapted to be connected to a suitable instrumentality for rotating the same, and for this purpose, there has been shown by way of illustration, a pulley 8 fixed to the upper end of the sleeve 5 for connection through means of a belt to a drive motor (not shown).

The lower end of the sleeve 5 is enlarged, as at 5', and adjacent to the bottom of the enlarged end 5' there is provided a plurality of radially outwardly projecting lugs 9. Pivotally mounted on each lug 9 is a lever arm 10, connected thereto by a pin 11. The upper end of each lever arm 10 is extended in the form of a bar 12 having a weight 13 adjustably mounted thereon. The adjustment may be effected by threaded engagement between each weight 13 and its supporting arm 12, although other forms of adjustment may be used if preferred. Carried by the lower part 5' of the sleeve 5, and extending radially outwardly therefrom, is a plurality of arms 14 corresponding in number to the levers 10. Each of the rods or bars 12 is slotted to loosely receive one of the arms 14, and a coil spring 15 is mounted on each arm 14 so as to encircle the latter, with one end of each coil spring abutting against the sleeve portion 5', and the other end of each coil spring abutting against its corresponding arm or bar 12, whereby to normally exert a light pressure against each bar 12 tending to rock the upper ends of the levers 10 in an outward direction and their lower ends in an inward direction. Carried by the lower extremity of each lever 10, and freely rotatable thereon, is a tapered roller 16. As clearly illustrated in the drawings, each roller converges from bottom to top at an angle of about sixty degrees, which may be varied as desired to suit different conditions. It will be understood from the foregoing that the rollers 16 are rotated about the axis of the sleeve 5 responsive to rotation of the sleeve. During such rotation, the centrifugal force acts upon the weights 13 to pull the same radially outwardly in proportion to their distance of adjustment above the pivotal axes 11 of the levers 10. The outward pull on the weights 13, due to centrifugal force, tends to move the rollers 16 radially inwardly towards the central axis of the sleeve, so that when the rollers are brought into engagement with the skirt of the closure 2 on the receptacle 1, they will create a substantial pressure thereon, forcing the closure skirt into close smooth sealing engagement with the lip or bead of the receptacle.

Extending axially through the sleeve 5 and its enlarged portion 5', is a rod or plunger 17 having an enlarged head 18 formed on its lower end as an integral part thereof or otherwise, as preferred. The central portion 19 of the head 18 has its diameter approximately equal to or slightly less than the internal diameter of the lower sleeve portion 5'. The lower extremity 20 of the head 18 is slightly larger than the central portion 19, and is beveled, as at 21, at an angle complementary to the taper of the rollers 16. The diameter at the bottom of the bevel portion 20 of the head 18 is approximately equal to the external diameter of the lip or bead at the upper extremity of the receptacle 1, so that the rollers 16 will be restrained by the plunger head against inward movement beyond a point which will allow the same to receive the upper extremity of the receptacle therebetween, as will hereinafter more fully appear.

The head 18 is reduced, as at 22, to provide an annular seat 23 for a coil spring 24 disposed within the enlarged sleeve portion 5', the coil spring being preferably disposed in spaced relation to the enclosing sleeve portion. The upper extremity of the spring 24 abuts against a collar 25 which is loosely mounted on the rod 17 and also loosely disposed within the sleeve portion 5'. The rod 17 is provided with a slot 26 extending diametrically through the same, and a pin 27 is disposed in the slot 26 and extends through the collar 25 to allow a limited axial movement of the collar upon the rod 17, while preventing relative rotation therebetween. Interposed between the upper side of the collar 25 and the upper end of the enlarged sleeve portion 5', is an anti-friction bearing 28 of the ball or other appropriate type. The spring 24 normally urges the collar 25 into engagement with the bearing 28, while the pin 27 is normally disposed near the upper end of the slot 26 in the rod 17.

The rod 17 and the parts carried thereby are axially movable relative to the sleeve 5 and its associated parts, and vice versa, but the rod is held against rotation while the sleeve 5 and the parts carried by the latter are rotatable about the rod. The entire assembly is normally suspended in the bearing 4 which forms a part of the supporting frame 3, and is movable upwardly and downwardly relative to the bearing 4 in a manner now to be described. This upward and downward movement above referred to may be accomplished by any suitable instrumentalities, the same being preferably of the type which is automatically operated in timed relation to receptacle positioning instrumentalities by means of which receptacles having closures loosely disposed thereon are intermittently brought beneath the sealing or spinning apparatus and moved away from the same after the spinning operation, as has been more fully described in my earlier application previously referred to. For the purposes of the present application, the part designated 29 will be generally understood as an operating lever which is movable in an upward and downward direction to impart corresponding upward and downward movement to the spinning head which is made up of the elements hereinbefore described. As illustrated, the lever 29 is provided with a slot 30 adjacent to its free extremity, and a pin 31 extends through the slot 30 and also through a vertically elongated slot 32 in the upper end of the rod 17. An anti-friction bearing 33, which has been illustrated as a ball-bearing, is preferably interposed between the lever 29 and the driving pulley 8.

In the use of the apparatus, it will be understood that the parts normally assume the positions illustrated in Figure 1 preparatory to bringing a receptacle into closure sealing position, with the rollers 16 disposed somewhat above the upper end of the receptacle. Rotation of the pulley 8 is preferably commenced prior to commencement of the actual closure sealing operation, in order that the sleeve portions 5, 5' and the weighted roller supporting levers carried thereby will be brought up to operating speed to produce a sufficient centrifugal action upon the weights 13 for the purposes intended. During rotation of the sleeve portions 5, 5', the rod or plunger 17, the spring 24, and the collar 25, remain stationary—that is, are held against rotation. The bearing 23 prevents any material drag being imposed upon the rotating sleeve by the spring 24, and at the same time, relieves the spring from any material torsion caused by rotation of the sleeve. When the receptacle 1 has been disposed in an operative position, as shown in Figure 1, coaxial with the sealing or spinning head, as the apparatus may be appropriately termed, the operating lever 29 is then caused to move in a downward direction, thus simultaneously lowering the rod or plunger 17 and the sleeve parts 5, 5', together with the elements associated therewith, while preserving their same relative positions as shown in Figure 1, until the part 28 rests upon the upper side of the closure 2 on the upper end of the receptacle 1. Thereafter, continued downward movement of the operating lever 29 exerts pressure upon the bearing 33, which pressure is in turn transmitted to the pulley 8 and the upper end of the sleeve 5, thereby causing these parts, together with the rollers 16, to move downwardly relative to the rod 17. During this relative movement just referred to, the sleeve portions 5, 5' are guided by the rod 17 and the enlarged head portion 19 on the lower end of the same, respectively, and the spring 24 is caused to be compressed due to the downward movement of the collar 25 along with the sleeve portion 5', as permitted by the slot 26 in the rod 17. As the rollers 16 move downwardly along with the sleeve portions 5, 5', they progressively engage the cap skirt while rotating rapidly about the same, so as to cause the cap skirt to be firmly and smoothly pressed into engagement with the outer surface of the lip or bead at the mouth of the receptacle 1. The rollers 16 automatically follow the contour of the outer surface of the receptacle lip or bead, as will be clearly understood from reference to Figure 3, and the pressure exerated by the rollers 16 upon the skirt of the cap 2 is maintained uniform by the centrifugal force acting upon the weights 13, which may be adjusted upwardly or downwardly on their respective rods 12 to increase or decrease the pressure exerted against the closure by the rollers. The downward movement of the rollers 16 is preferably continued until the rollers pass beyond the lower extremity of the closure 2. At some point below the closure, the rollers 16 are preferably automatically caused to be moved radially outwardly, as shown in Figure 4, preparatory to commencement of the upward movement to restore the rollers to a position permitting displacement of the sealed receptacle and conditioning the same for commencing another sealing cycle. This automatic outward movement of the rollers 16 will now be more fully described.

Extending about the lower end of the spinning head is a generally cylindrical member 34, which is fixedly suspended in any suitable manner as by rigid attachment to the frame 3 or to the lower end of the stationary bearing 4 or other part of the frame 3. The member 34 may be extended upwardly about the rods 12 and weights 13, if desired, to form a casing or guard therefor; or it may be of relatively low height as shown in the drawings. In any case, it is sufficiently spaced outwardly from the pivotal levers 10 to allow ample clearance for these parts in performing their rocking functions in response to the centrifugal force acting thereon, as hereinbefore described. The lower extremity of the member 34 is formed with a radially inwardly projecting annular flange 35, and another radially inwardly projecting annular flange 36 is disposed above the flange 35. An annular ring 37 is loosely mounted within the member 34 intermediate the flanges 35 and 36, and this ring is free to float in an upward and downward direction between the flanges which constitute abutments for limiting the axial movement of the ring 37. The upper extremity of each of the supporting levers 10 which serve to support the rollers 16 is formed with an inclined cam face 38, which is adapted to engage the floating ring 37 as the rollers 16 approach the end of their downward movement during the cap sealing operation. As clearly shown in the drawings, the ring 37 slightly overhangs the lower abutment flange 35 so that the cam face on each lever 10 will freely engage the ring 37 to cause the upper ends of the respective levers 10 to be rocked inwardly, and the lower ends which carry the rollers 16 to be rocked outwardly away from the receptacle. Each of the levers 10 is provided with a flat surface 39 above its cam face 38. As the downward movement of the rollers 16 is continued and reaches the lower limit, as shown in Figure 4, the flat surfaces 39 of the levers 10 engage the inside of the floating ring 37, as shown in Figure 4, positively holding the rollers 16 in an outward position at a sufficient distance from the receptacle 1, which will permit the spinning head to be raised without causing the rollers to again engage the closure which has previously been sealed on the receptacle. Due to the fact that the sleeve portion 5' is rotating at a comparatively high speed, the centrifugal force will cause the surfaces 39 of the respective levers 10 to press firmly against the inside of the floating ring 37, and in this condition of the parts, the operating lever commences its upward movement, allowing the spring 24 to force the sleeve portions 5, 5' and the parts carried thereby in an upward direction, carrying the floating ring 37 along with the levers 10. As the rollers 16 approach a position near the upper extremity of the receptacle 1, the ring 37 comes into engagement with the upper abutment flange 36, as shown in Figure 5, and the ring is then held against further upward movement. As the upward movement of the sleeve portions continues, the levers 10 are withdrawn through the ring 37 until the cam faces 38 have passed above the ring, whereupon the ring falls by gravity to its lower position against the bottom abutment flange 35, as shown in Figure 1, thereby freeing the levers 10 so that they may move to their inward positions under the influence of the centrifugal forces acting thereon. As the rollers 16 approach an elevation coinciding with the upper extremity of the receptacle, the plunger 17, which has until this time remained in a position with its head in firm yieldable engagement with the flat portion of the closure across the mouth of the receptacle, is picked up by the operating lever 29 through engagement of the pin 31 with the upper extremity of the slot 32, and as the upward movement of the lever 29 continues, the plunger 17 and its enlarged head on the lower end of the same is moved upwardly out of engagement with the receptacle, along with the upward movement of the sleeve portions and the parts carried thereby, thus freeing the sealed receptacle for displacement, and reconditioning the spinning apparatus for commencement of another sealing cycle. When the closure 2 has been sealed on the receptacle, it will be tightly and smoothly stretched across the mouth of the receptacle with its skirt firmly and smoothly pressed into close engagement with the bead or lip of the mouth of the receptacle, as clearly shown in Figure 6. A substantially perfect hermetical seal may be produced in a very efficient and practical manner through the use of my invention, the entire sealing operation occupying only a momentary time interval. My invention is accordingly eminently suited for use in continuous capping systems.

While the details of construction have been herein shown and described, the invention is not confined thereto, as changes and alterations may be made without departing from the spirit thereof as defined by the appended claims.

Having thus described my invention, what I claim as new and desire to secure by Letters Patent is—

1. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same and axially movable relative thereto, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, said yieldable means comprising a coil spring encircling the plunger and having one end in abutting engagement with the plunger and its other end seated on a collar loosely carried by the plunger, said collar having a limited axial movement relative to the plunger, and means for lowering the spinning head relative to the frame aforesaid to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure.

2. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same and axially movable relative thereto, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, said yieldable means comprising a coil spring encircling the plunger and having one end in abutting engagement with the plunger and its other end seated on a collar loosely carried by the plunger, said collar having a limited axial movement relative to the plunger, anti-friction means interposed between the collar and the rotary member, and means for lowering the spinning head relative to the frame aforesaid to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure.

3. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same and axially movable relative thereto, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, said yieldable means comprising a coil spring encircling the plunger and having one end in abutting engagement with the plunger and its other end seated on a collar loosely carried by the plunger, said collar having a limited axial movement relative to the plunger, means for restraining the collar against rotary movement relative to the plunger, and means for lowering the spinning head relative to the frame aforesaid to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure.

4. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same axially movable relative thereto, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, said yieldable means comprising a coil spring encircling the plunger and having one end in abutting engagement with the plunger, a collar loosely mounted on the plunger and disposed for abutting engagement with the opposite end of the coil spring, said plunger having a slot therein, a pin extending transversely through the collar and plunger at the slot in the latter for permitting limited axial movement of the collar on the plunger, while restraining the collar against rotation relative to the plunger, and means for lowering the spinning head relative to the frame aforesaid to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure.

5. In apparatus of the class described a rotatable vertically reciprocable supporting means, a plurality of rollers carried by said supporting means for rotation about a common center, and including means for normally urging the rollers towards the common center pursuant to the action of centrifugal force thereon, while allowing lateral movement of said rollers towards and away from said common center during such rotation, and means for automatically moving said rollers away from said common center as the supporting means approaches the limit of its reciprocal motion in one direction, and for restraining the rollers against movement towards the common center until the supporting means approaches the limit of its reciprocal motion in the opposite direction, said automatic means comprising a cam associated with each roller, an annular member extending coaxially about the roller supporting means in spaced relation to the same for operative engagement with the cams and having a limited axial floating movement, and abutment means for engaging said annular member to disengage the latter from the cams as the supporting means approaches the limit of its reciprocal movement in the opposite direction aforesaid.

6. In apparatus of the class described, a rotatable vertically reciprocable supporting means, a plurality of rollers carried by said supporting means for rotation about a common center, and including means for normally urging the rollers towards the common center pursuant to the action of centrifugal force thereon, while allowing lateral movement of said rollers towards and away from said common center during such rotation, and means for automatically moving said rollers away from said common center as the supporting means approaches the limit of its reciprocal motion in one direction, and for restraining the rollers against movement towards the common center until the supporting means approaches the limit of its reciprocal motion in the opposite direction, said automatic means comprising a cam associated with each roller, and an annular member extending coaxially about the roller supporting means in spaced relation to the same, and axially spaced abutment means engageable by said annular member, one of said abutment means serving to support the annular member in a position of rest, and another of said abutment means serving to disengage the annular member from the cams responsive to upward movement of said roller supporting means following a downward movement of the same effecting engagement of the cams with the annular member.

7. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same and axially movable relative thereto, means operatively connected to the upper end of the hollow rotary member for rotating the same, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, and means having a lost motion connection with the plunger at a point above the rotating means for imparting reciprocating motion to the spinning head to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure.

8. In apparatus for securing a skirted closure to the mouth of a receptacle upon which the closure has been loosely seated, a frame, a spinning head vertically reciprocable in said frame, said spinning head comprising a hollow rotary member and a plunger disposed coaxially within the same and axially movable relative thereto, means operatively connected to the upper end of the hollow rotary member for rotating the same, roller means movably carried by said rotary member and operable by centrifugal force during the rotation of said member to move the roller means in a direction generally normal to the axis of rotation, yieldable means disposed within the rotary member and coacting with the same and with the plunger for causing the lower end of the plunger to normally assume a position about in the plane of the roller means for conjoint movement therewith, means having a lost motion connection with the plunger at a point above the rotating means for imparting reciprocating motion to the spinning head to initially engage the lower end of the plunger with the closure to firmly press the same against and hold the closure stationary on the mouth of the receptacle while the roller means is positioned laterally adjacent to the closure skirt and progressively advanced below the plunger to force the skirt into sealing contact with the receptacle by the action of centrifugal force upon the roller means, and to subsequently raise the roller means and plunger above the closure, and antifriction means interposed between the reciprocating motion imparting means and the rotating means.

9. In apparatus of the class described, a plurality of oscillatable roller supports, each having a roller mounted thereon, said roller supports and rollers being rotatable about a common axis and also being axially reciprocable during such rotation, and means for positively actuating said roller supports in one direction of their oscillation at a predetermined point in the reciprocal movement thereof, and for restraining the same against oscillating movement in an opposite direction, said last named means comprising an inclined cam face on each roller support and an adjoining face disposed substantially parallel to the common axis aforesaid, a normally floating annular member disposed coaxially about the roller supports and initially engageable with the inclined cam faces thereof pursuant to relative reciprocal motion therebetween in one direction and ultimately engageable with the adjoining parallel faces of said supports upon further relative reciprocal movement therebetween in the same direction for conjoint movement with said supports in the opposite direction of their reciprocal movement while maintained in such engagement by centrifugal force acting upon said roller supports during their rotation about the common axis, and means for arresting the conjoint movement aforesaid of the annular member prior to completion of the reciprocal movement of the supports, whereby to restore the annular member to its initial floating condition.

10. Apparatus as claimed in claim 9, in combination with axially spaced abutment means engageable by said annular member to limit the floating movement of the same.

LUIGI PERRONE.